(12) United States Patent
Duβler et al.

(10) Patent No.: US 7,637,509 B2
(45) Date of Patent: Dec. 29, 2009

(54) HIGH PRESSURE FUEL PUMP WITH A GASKET

(75) Inventors: Karl Duβler, Neu-Ulm (DE); Karl Huber, Lengfurt (DE); Hans-Ulrich Leutwein, Alteglofsheim (DE); Josef Ludwig, Niederstotzingen (DE); Matthias Weidner, Wasserlosen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/273,652

(22) Filed: Nov. 19, 2008

(65) Prior Publication Data

US 2009/0072492 A1 Mar. 19, 2009

Related U.S. Application Data

(63) Continuation of application No. 11/220,487, filed on Sep. 7, 2005, now abandoned, which is a continuation of application No. PCT/EP2004/001699, filed on Feb. 20, 2004.

(30) Foreign Application Priority Data

Mar. 7, 2003 (DE) ................................. 10 310 124

(51) Int. Cl.
*F16J 15/02* (2006.01)
*F04B 1/04* (2006.01)
*F16J 15/18* (2006.01)

(52) U.S. Cl. ...................... 277/637; 277/598; 417/273; 92/168

(58) Field of Classification Search ................ 277/598, 277/630, 637; 417/273, 571, 470; 92/171.1, 92/168
See application file for complete search history.

(56) References Cited

U.S. PATENT DOCUMENTS

| 1,851,948 | A | | 3/1932 | Summers |
| 3,108,818 | A | | 10/1963 | Furstenburg ................. 277/189 |
| 3,236,217 | A | * | 2/1966 | Phillips ..................... 123/495 |

(Continued)

FOREIGN PATENT DOCUMENTS

| CH | 268267 | 8/1950 |
| DE | 19731132 | 7/1997 |
| DE | 19942698 | 9/1999 |

(Continued)

*Primary Examiner*—Vishal Patel
(74) *Attorney, Agent, or Firm*—King & Spalding L.L.P.

(57) ABSTRACT

The invention relates to a gasket (1), particularly for a fuel high-pressure pump, comprising a first cutout (2) for a cylinder head, a second cutout (3) for a high-pressure channel, and a third cutout (4) for an induction channel. A first (5) and second sealing bead (6) are respectively formed around the cutouts for the high-pressure channel as well as around the cutout for the induction channel. The gasket (1) comprises a wider third sealing bead (7) that is formed so that it encircles the other sealing beads.

9 Claims, 2 Drawing Sheets

U.S. PATENT DOCUMENTS

| | | | |
|---|---|---|---|
| 5,775,701 A | 7/1998 | Martini | 277/207 R |
| 6,036,195 A | 3/2000 | Udagawa | 277/595 |
| 6,098,597 A * | 8/2000 | Warmoth et al. | 123/447 |
| 6,224,351 B1 | 5/2001 | Simon et al. | 417/273 |
| 6,439,859 B1 * | 8/2002 | de Matthaeis et al. | 417/273 |
| 7,415,920 B2 * | 8/2008 | Knauth et al. | 92/171.1 |
| 2004/0041552 A1 | 3/2004 | Okamoto et al. | 323/318 |
| 2005/0220633 A1 * | 10/2005 | Hunsberger et al. | 417/279 |

FOREIGN PATENT DOCUMENTS

| | | |
|---|---|---|
| DE | 100 60 872 A1 | 12/2000 |
| DE | 198 41 642 C2 | 7/2002 |
| EP | 1 197 689 A2 | 10/2001 |
| EP | 1 279 871 A2 | 7/2002 |
| EP | 1762757 | 9/2005 |
| WO | 93/09366 | 5/1993 |

* cited by examiner

HIGH PRESSURE FUEL PUMP WITH A GASKET

CROSS-REFERENCE TO RELATED APPLICATIONS

This application is a continuation of U.S. patent application Ser. No. 11/220,487 filed on Sep. 7, 2005 now abandoned, which is a continuation of co-pending International Application No. PCT/EP2004/001699 filed Feb. 20, 2004, which designates the United States of America, and claims priority to German application number 103 10 124.1 filed Mar. 7, 2003. The contents of these applications are incorporated herein in their entirety by this reference.

TECHNICAL FIELD

The invention relates to a gasket, in particular for fuel high-pressure pumps.

BACKGROUND

A fuel high-pressure pump is known from DE 198 41 642 C2 which has a pump housing and a plurality of cylinder heads. Each cylinder head is fixed in the pump housing a centering shoulder. An induction line runs from the pump housing into the cylinder. The fuel reaches the cylinder chamber from the induction line via an induction valve. In the cylinder chamber the fuel is compressed and is then fed back into the pump housing via a high-pressure valve and a high-pressure line, from where the fuel is fed to a common high-pressure accumulator, known as the Common Rail. An O-ring seal is arranged between the cylinder and the pump housing. To accommodate the O-ring seal the cylinder head has a groove. Inserting the O-ring calls for a good deal of assembly work, and it can easily happen that the O-ring does not lie correctly in the groove. When the cylinder head is screwed up the O-ring is then squeezed between the sealing surfaces of the two components and is damaged. As a result, fuel can escape from the fuel high-pressure pump.

SUMMARY

The object of the invention is hence to ensure a secure seal of the fuel high-pressure pump combined with ease of assembly of the seal.

The object is achieved by a gasket comprising a first cutout for a cylinder head, a second cutout for a high-pressure channel, a third cutout for an induction channel, a first sealing bead around the second cutout for the high-pressure channel, a second sealing bead around the third cutout for the induction channel, a third sealing bead which encircles the first and second sealing bead, and a discharge opening being introduced within the surface encircled by the sealing bead.

The first sealing bead, which is arranged around the high-pressure channel, may have a coaxial profiling. The coaxial profiling may have a wave-shaped and/or sawtooth-shaped profile. The seal may have positioning tabs for precise positioning of the seal between the components to be sealed or on one of the components to be sealed. The gasket may consist of a spring steel or of a metal which can preferably be worked cold. The seal can be coated at least partially with an elastomer or another suitable plastic, or with metal.

The invention is characterized in that the seal is formed as a gasket. The gasket has a first cutout for the cylinder head, a second cutout for the high-pressure channel and a third cutout for the induction channel. Around the cutout for the high-pressure channel is a first sealing bead and around the cutout for the induction channel is a second sealing bead. Additionally there is a third sealing bead in the gasket, said sealing bead encircling the first and the second sealing bead. This ensures that if the first and/or second sealing beads are leaking, no fuel can reach the outside via the sealing surfaces but that thanks to the third encircling sealing bead it is guaranteed at all times that the gasket is leakproof.

In order to ensure a particularly secure seal in the region of the high-pressure channel, an advantageous embodiment of the invention provides for a sealing bead with coaxial profiling, preferably with a wave-shaped and/or sawtooth-shaped profile around the cutout for the high-pressure channel. A sealing bead profiled like this is already known from DE 100 60 872 A1, the disclosure of which is included in this respect.

In a particularly advantageous embodiment of the invention there are positioning tabs on the gasket. With the aid of the positioning tabs the gasket can be precisely positioned, as a result of which incorrect assembly can be largely excluded.

BRIEF DESCRIPTION OF THE DRAWINGS

An exemplary embodiment of invention is explained in the following with the aid of the schematic drawings.

DETAILED DESCRIPTION

Figure 1:
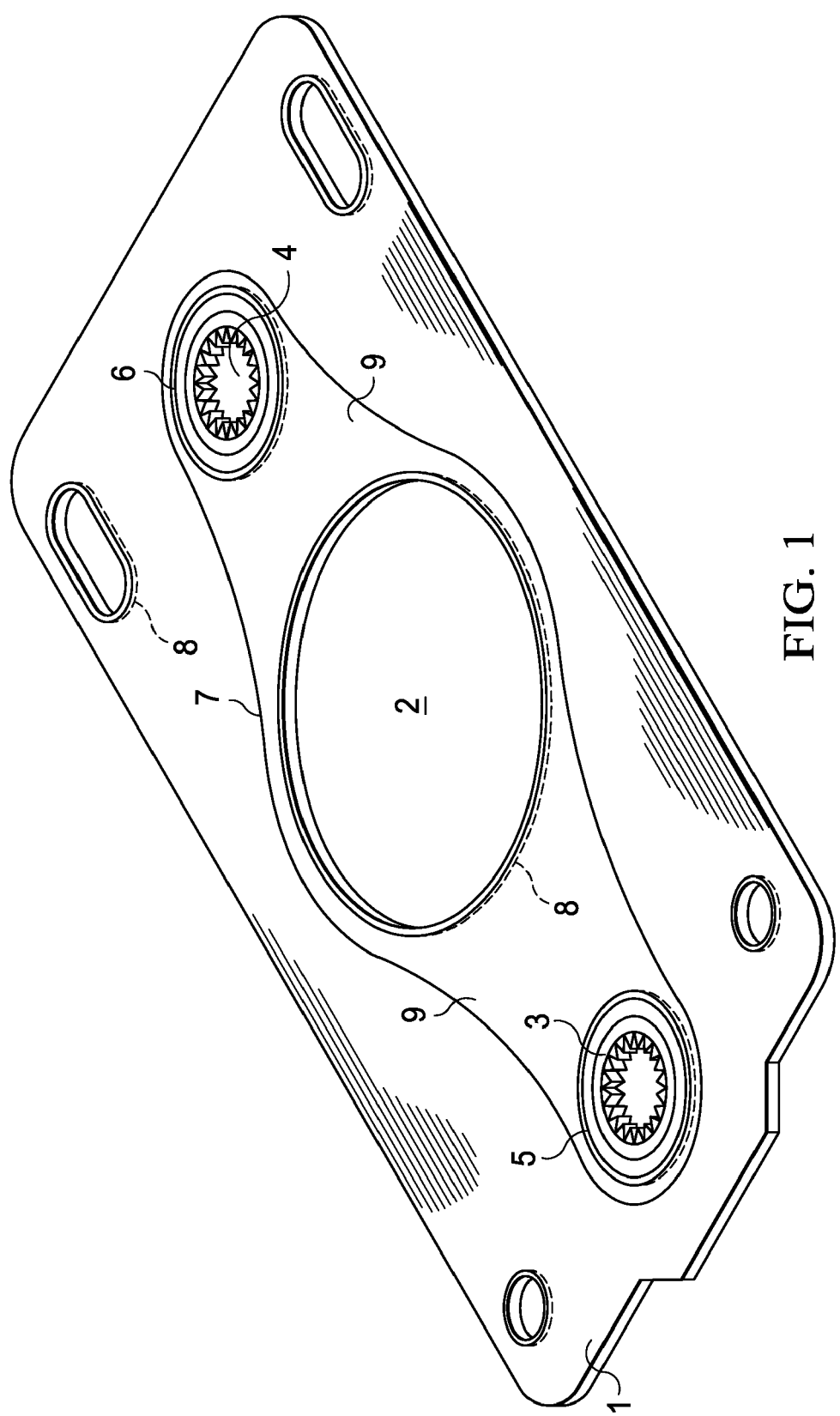
FIG. 1 shows a three-dimensional representation of the inventive gasket.
Figure 2:
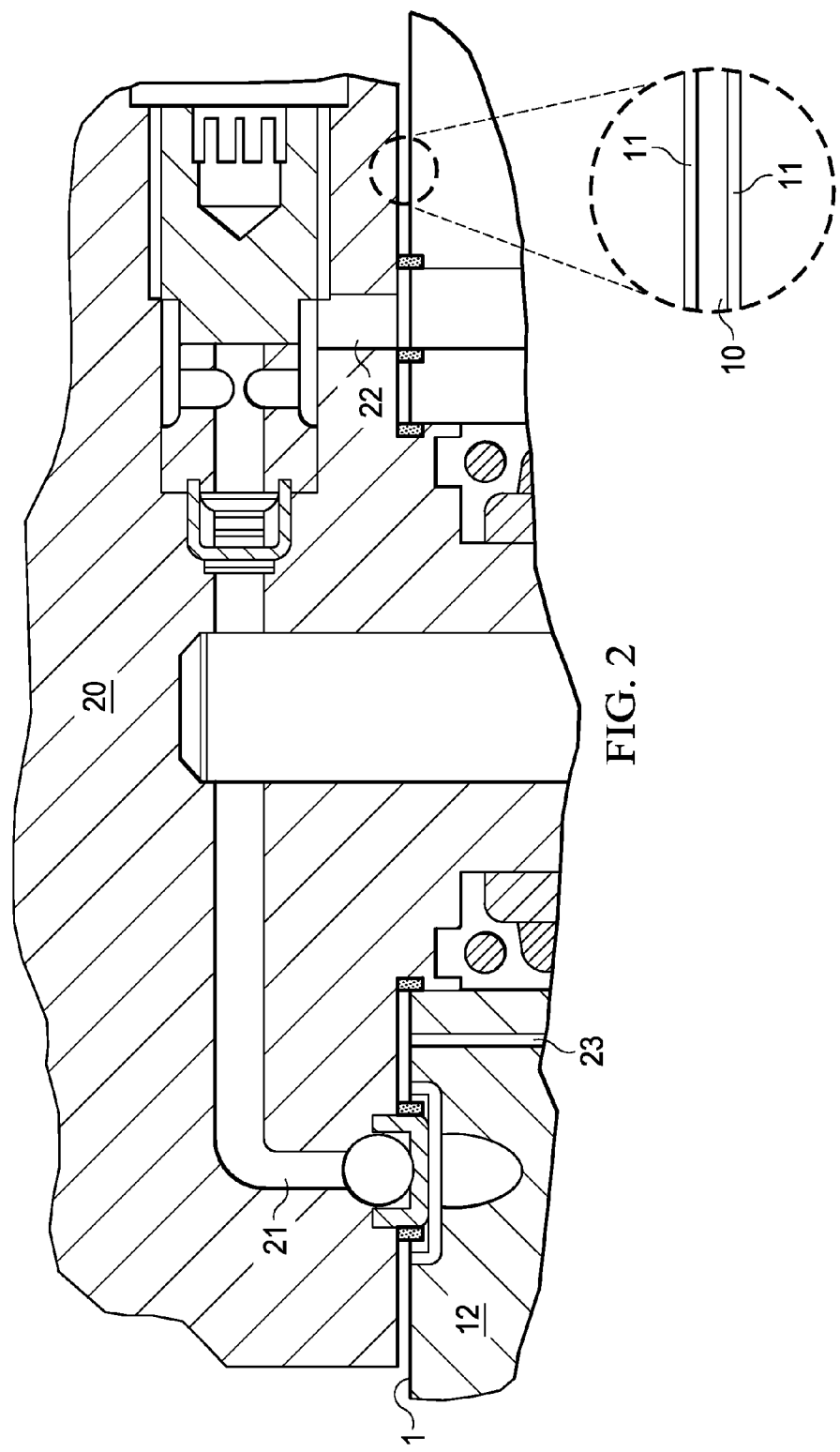
FIG. 2 shows a detailed view of a fuel high-pressure pump with a gasket in accordance with FIG. 1.

FIG. 1 shows a three-dimensional representation of the gasket and FIG. 2 a detailed view of a fuel high-pressure pump with the gasket shown in FIG. 1. The figures are jointly explained below.

The gasket 1 has a first cutout 2 for the cylinder head 20, a second cutout 3 for the high-pressure channel 21 and a third cutout 4 for the induction channel 22. A first and a second essentially circular sealing bead 5, 6 run respectively around the cutout for the high-pressure channel and around the cutout for the induction channel. The first sealing bead 5 for the high-pressure channel has a coaxial profiling with several waves. The narrow ring-shaped contact surfaces of the profiled sealing bead produce a high compressive load on the components to be sealed. The second sealing bead 6 for the induction channel can be formed as a simple sealing bead, since the liquid pressure in the induction channel is low. In addition to the first and second sealing bead 5, 6 there is an additional third sealing bead 7 in the gasket, which is designed such that it encircles both the first and the second sealing bead 5, 6. This produces a particularly secure seal. If the first and/or second sealing bead 5, 6 is leaking, the liquid cannot escape from the housing 12 of the fuel pump, but is retained by the encircling sealing bead 7. So that no liquid pressure can build up within the encircling sealing bead 7, the gasket 1 has a drain opening 9 within the surface encircled by the sealing bead 7. Thanks to the drain opening 9 the liquid escaping from a leak can flow out of the space formed by the third sealing bead 7. To this end, a drain line 23 is provided in the fuel pump, which routes the flow of the leak into the interior of the pump.

For ease of assembly of the gasket between the components to be sealed or on one of the components to be sealed, the gasket has several positioning tabs 8. The positioning tabs engage cutouts of an adjoining component in the assembled state, as a result of which it can be ensured that the gasket is assembled quickly and in the right position. This results in a significant saving of time for assembly compared to the prior art. Additionally, incorrect assembly is thereby largely excluded.

The gasket is manufactured in particular from a spring steel or from another metal 10 that can preferably be worked cold, and is preferably coated 11 at least partially with an elastomer or another suitable plastic or metal. (See FIG. 2) The coating enables rugosities on the sealing surfaces of the housing and of the cylinder to be evened out. The coating presses into the unevennesses when fastening the seal and largely fills these up, as a result of which a secure seal is ensured.

The proposed invention is thus suitable for securely sealing, with a single component simultaneously, both the high-pressure channel and the induction channel of a fuel high-pressure pump, it not being possible for the fuel to escape from the pump housing 12 in the event of a fuel leak, because it is retained by an additional sealing bead. Within a temperature range from −40° C. to +140° C., the sealing beads possess sufficient elasticity and thus ensure a secure seal across the entire range of use. The gasket is simple to manufacture, for example by punching, and is thus particularly inexpensive. Additional positioning tabs ensure simple and secure assembly.

The invention is not of course restricted to the exemplary embodiment. In particular, those seals are also included in which more than two inner sealing beads are encircled by a further sealing bead.

What is claimed is:

1. A fuel high-pressure pump comprising:
   a pump housing and at least one cylinder head, wherein the cylinder head is fixed in the pump housing via a centering shoulder;
   an induction line having an induction channel running through the cylinder head and the pump housing;
   a high pressure channel running through the cylinder head and the pump housing;
   a drain line in the pump housing; and
   a gasket of the fuel high-pressure pump positioned between the pump housing and the cylinder head, the gasket comprising:
   a first cutout corresponding to the centering shoulder of the cylinder head;
   a second cutout corresponding to the high-pressure channel;
   a third cutout corresponding to the induction channel;
   a first sealing bead around the second cutout sealing the high-pressure channel of the fuel high-pressure pump;
   a second sealing bead around the third cutout sealing the induction channel of the fuel high-pressure pump;
   a third sealing bead which encircles the first and second sealing beads; and
   a drain opening within a surface of the gasket encircled by the third sealing bead, wherein the drain opening communicates with the drain line, wherein the gasket has positioning tabs precisely positioning the gasket between the pump housing and the cylinder head, wherein the gasket is coated at least partially with an elastomer or another suitable plastic, or with metal.

2. A fuel high-pressure pump according to claim 1, wherein the first sealing bead of the gasket, which is arranged around the high-pressure channel of the fuel high-pressure pump, comprises a coaxial profiling.

3. A fuel high-pressure pump according to claim 1, wherein the gasket consists of a spring steel or of a metal which can preferably be worked cold.

4. A fuel high-pressure pump according to claim 1, wherein the third sealing bead of the gasket, which is arranged around the induction channel of the fuel high-pressure pump, has a coaxial profiling with a plurality of waves.

5. A fuel high-pressure pump comprising:
   a pump housing and at least one cylinder head, wherein the cylinder head is fixed in the pump housing via a centering shoulder;
   an induction line having an induction channel running through the cylinder head and the pump housing;
   a high pressure channel running through the cylinder head and the pump housing;
   a drain line in the pump housing; and
   a gasket of the fuel high-pressure pump positioned between the pump housing and the cylinder head, the gasket comprising:
   a first opening in the gasket corresponding to a cylinder head of the fuel high-pressure pump;
   a second opening in the gasket corresponding to a high-pressure channel of the fuel high-pressure pump;
   a third opening in the gasket corresponding to an induction channel of the fuel high-pressure pump;
   a first sealing bead around the second opening;
   a second sealing bead around the third opening;
   a third sealing bead which encircles the first and second sealing bead; and
   a drain opening within a surface of the gasket encircled by the third sealing bead, wherein the gasket has positioning tabs precisely positioning the gasket between the pump housing and the cylinder head, wherein the gasket is coated at least partially with an elastomer or another suitable plastic, or with metal.

6. A fuel high-pressure pump according to claim 5, wherein the first sealing bead of the gasket, which is arranged around the high-pressure channel of the fuel high-pressure pump, has a coaxial profiling.

7. A fuel high-pressure pump according to claim 5, wherein the gasket of the fuel high-pressure pump consists of a spring steel or of a metal which can preferably be worked cold.

8. A fuel high-pressure pump according to claim 5, wherein the second sealing bead of the gasket of the fuel high-pressure pump, which is arranged around the high-pressure channel of the fuel high-pressure pump, has a coaxial profiling with a plurality of waves.

9. A fuel high-pressure pump according to claim 5, wherein the third sealing bead of the gasket of the fuel high-pressure pump, which is arranged around the induction channel of the fuel high-pressure pump, has a coaxial profiling with a plurality of waves.

* * * * *